United States Patent
Kim et al.

(10) Patent No.: US 12,374,944 B2
(45) Date of Patent: Jul. 29, 2025

(54) ROTOR FOR A ROTATING ELECTRIC MACHINE INCLUDING END PLATES AND FIXING PORTIONS

(71) Applicant: Mitsubishi Electric Corporation, Tokyo (JP)

(72) Inventors: Seokho Kim, Tokyo (JP); Yoshiki Kuwahara, Tokyo (JP); Satoru Nakada, Tokyo (JP); Yuki Michimuko, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 221 days.

(21) Appl. No.: 18/162,790

(22) Filed: Feb. 1, 2023

(65) Prior Publication Data

US 2023/0283124 A1    Sep. 7, 2023

(30) Foreign Application Priority Data

Mar. 7, 2022   (JP) ................................ 2022-034020

(51) Int. Cl.
*H02K 1/2733*    (2022.01)
*H02K 1/28*      (2006.01)

(52) U.S. Cl.
CPC ............ *H02K 1/2733* (2013.01); *H02K 1/28* (2013.01)

(58) Field of Classification Search
CPC .. H02K 1/28; H02K 1/30; H02K 1/27; H02K 1/2706; H02K 1/274; H02K 1/276; H02K 1/22; H02K 1/2733
USPC ............ 310/156.01, 156.08, 156.22, 156.28, 310/156.29, 156.31, 156.56, 156.61
See application file for complete search history.

(56) References Cited

FOREIGN PATENT DOCUMENTS

| EP | 1530278 A2 * | 5/2005 | ............. H02K 1/246 |
|----|----|----|----|
| JP | 2002-095197 A | 3/2002 | |
| JP | 2005-318785 A | 11/2005 | |
| JP | 2008178253 A * | 7/2008 | ............. H02K 15/02 |
| JP | 2010-4619 A | 1/2010 | |
| JP | 2010004619 A * | 1/2010 | |
| JP | 2012-125000 A | 6/2012 | |
| JP | 2013-158076 A | 8/2013 | |

(Continued)

OTHER PUBLICATIONS

Machine Translation of JP_2010004619_A (Year: 2010).*

(Continued)

*Primary Examiner* — Alexander A Singh
*Assistant Examiner* — Charlie Frank Mann, Jr.
(74) *Attorney, Agent, or Firm* — Sughrue Mion, PLLC

(57) ABSTRACT

Provided is a rotor for a rotating electric machine, including: a rotation shaft member; a rotor core; a first end plate and a second end plate; and a first fixing member and a second fixing member. The first end plate is arranged between the rotor core and the first fixing member in the axial direction. The second end plate is arranged between the rotor core and the second fixing member in the axial direction. At least one of the first fixing member or the second fixing member includes an inner peripheral portion, and an outer peripheral portion provided on an outer side with respect to the inner peripheral portion in the radial direction. Rigidity of the outer peripheral portion is lower than rigidity of the inner peripheral portion. The outer peripheral portion is in contact with the first end plate or the second end plate.

9 Claims, 8 Drawing Sheets

(56) References Cited

FOREIGN PATENT DOCUMENTS

JP          2015-100227 A     5/2015

OTHER PUBLICATIONS

Machine Translation of EP_1530278_A2 (Year: 2005).*
JP_2008178253_A (Year: 2008).*
Notification of Reasons for Refusal dated May 9, 2023 from the Japanese Patent Office in application No. 2022-034020.

* cited by examiner

ROTOR FOR A ROTATING ELECTRIC MACHINE INCLUDING END PLATES AND FIXING PORTIONS

BACKGROUND OF THE INVENTION

Field of the Invention

This disclosure relates to a rotor for a rotating electric machine.

Description of the Related Art

In Patent Literature 1, a rotor is disclosed. The rotor includes a shaft, a laminated core, permanent magnets, end plates, and fixing members. The laminated core has a configuration in which a plurality of magnetic steel sheets are laminated in an axial direction. The laminated core is fixed to an outer peripheral side of the shaft. The permanent magnets are arranged in the laminated core. The end plates restrict movement of the permanent magnets in the axial direction. The fixing members fix the end plates.

CITATION LIST

Patent Literature

[PTL 1] JP 2005-318785 A

In the rotor as described above, due to an influence of warpage or the like that is caused in each magnetic steel sheet, a thickness of the laminated core in the axial direction is increased toward an outer side in a radial direction. As a result, warpage is caused in each of the end plates. When warpage is caused in the end plate, in a contact portion between the end plate and the fixing member, contact pressure to be applied to the end plate increases. Thus, there is a problem in that the end plate is liable to be broken.

SUMMARY OF THE INVENTION

This disclosure has been made in view of the problem as described above, and has an object to provide a rotor for a rotating electric machine, which is capable of suppressing breakage of an end plate.

According to at least one embodiment of this disclosure, there is provided a rotor for a rotating electric machine, including: a rotation shaft member; a rotor core arranged on an outer side with respect to the rotation shaft member in a radial direction of the rotation shaft member; a first end plate and a second end plate arranged at both ends of the rotor core in an axial direction of the rotation shaft member; and a first fixing member and a second fixing member configured to sandwich the rotor core, the first end plate, and the second end plate from both sides in the axial direction, wherein the first end plate is arranged between the rotor core and the first fixing member in the axial direction, wherein the second end plate is arranged between the rotor core and the second fixing member in the axial direction, wherein at least one of the first fixing member or the second fixing member includes an inner peripheral portion, and an outer peripheral portion provided on an outer side with respect to the inner peripheral portion in the radial direction, wherein rigidity of the outer peripheral portion is lower than rigidity of the inner peripheral portion so that the outer peripheral portion is elastically deformable in the axial direction, and wherein the outer peripheral portion is in contact with the first end plate or the second end plate.

According to the at least one embodiment of this disclosure, breakage of the end plate can be suppressed.

DESCRIPTION OF THE EMBODIMENTS

First Embodiment

Figure 1:
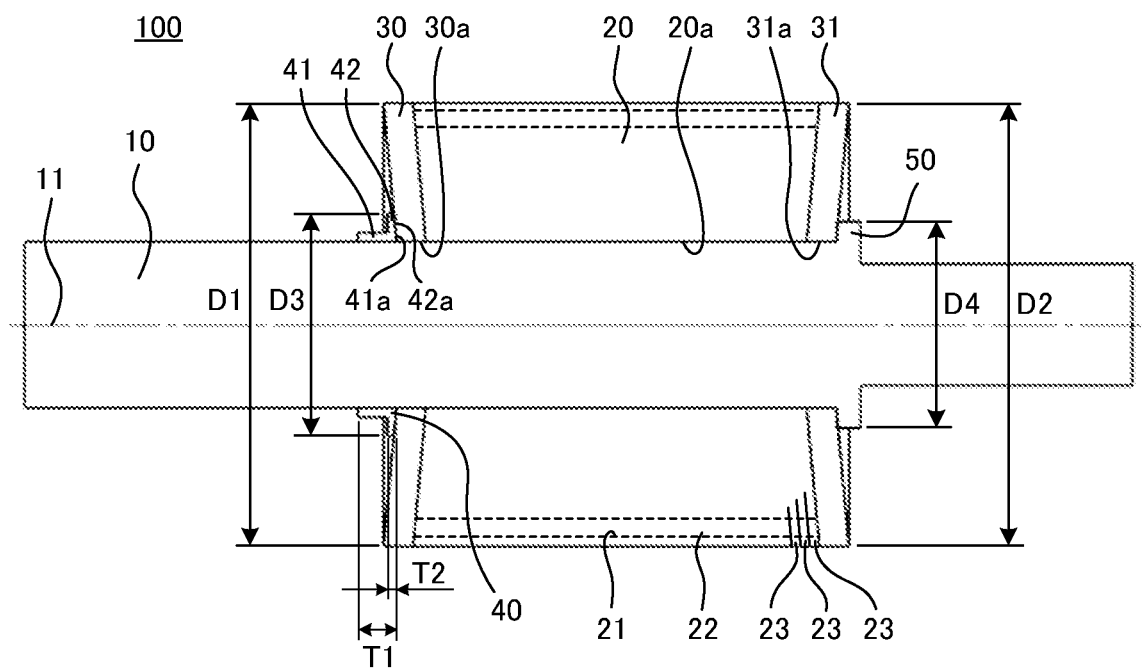
FIG. 1 is a sectional view of a rotor for a rotating electric machine according to a first embodiment.

A rotor for a rotating electric machine according to a first embodiment is described. FIG. 1 is a sectional view of the rotor for a rotating electric machine according to this embodiment. In the following description, a direction along an axial center 11 of a rotation shaft member 10 may be referred to as an axial direction of the rotation shaft member 10 or may be simply referred to as an axial direction. A direction along a circumference about the axial center 11 in a cross section perpendicular to the axial direction may be referred to as a circumferential direction of the rotation shaft member 10 or may be simply referred to as a circumferential direction. A direction along a radius of the rotation shaft member 10 in the cross section perpendicular to the axial direction may be referred to as a radial direction of the rotation shaft member 10 or may be simply referred to as a radial direction. In FIG. 1, a cross section of a rotor 100 taken along the axial direction and the radial direction is illustrated. A right-and-left direction of FIG. 1 represents the axial direction.

As illustrated in FIG. 1, the rotor 100 includes the rotation shaft member 10, a rotor core 20, a first end plate 30, a second end plate 31, a ring 40, and a flange 50. The rotor 100 is used for a rotating electric machine such as an electric motor or a generator.

The rotation shaft member 10 is configured to transmit rotational power between the rotating electric machine and an outside of the rotating electric machine. The rotation shaft member 10 has a columnar shape about the axial center 11.

The rotor core 20 is provided on an outer side with respect to the rotation shaft member 10 in the radial direction. The rotor core 20 has a cylindrical shape. The rotor core 20 has a configuration in which a plurality of magnetic steel sheets 23 are laminated in the axial direction. At the center portion of the rotor core 20, a through hole 20a having a circular cross section is formed. The rotation shaft member 10 is inserted into the through hole 20a. The rotor core 20 is fixed to the rotation shaft member 10.

The rotor core 20 has magnet insertion holes 21 formed therein. The magnet insertion holes 21 penetrate through the rotor core 20 in the axial direction. Permanent magnets 22 are inserted into the magnet insertion holes 21. The permanent magnets 22 are fixed in the magnet insertion holes 21 with use of resin or the like.

The first end plate 30 is arranged at one end of the rotor core 20 in the axial direction. The first end plate 30 is adjacent to one end surface of the rotor core 20 in the axial direction. The second end plate 31 is arranged at the other end of the rotor core 20 in the axial direction. The second end plate 31 is adjacent to the other end surface of the rotor core 20 in the axial direction. Both of the first end plate 30 and the second end plate 31 are provided on the outer side with respect to the rotation shaft member 10 in the radial direction. Each of the first end plate 30 and the second end plate 31 has a disk shape. Each of the first end plate 30 and the second end plate 31 is made of a non-magnetic material such as aluminum or stainless steel. In this embodiment, an outer diameter D1 of the first end plate 30, an outer diameter D2 of the second end plate 31, and an outer diameter of the rotor core 20 are equal to each other.

The first end plate 30 and the second end plate 31 have a function of preventing the permanent magnets 22 from projecting out from the magnet insertion holes 21. Each of the first end plate 30 and the second end plate 31 is arranged so as to overlap the magnet insertion holes 21 when viewed in the axial direction.

At the center portion of the first end plate 30, a through hole 30a having a circular cross section is formed. At the center portion of the second end plate 31, a through hole 31a having a circular cross section is formed. The rotation shaft member 10 is inserted into the through hole 30a and the through hole 31a.

The flange 50 is arranged on an outer side of the second end plate 31 in the axial direction. That is, the second end plate 31 is arranged between the rotor core 20 and the flange 50 in the axial direction. The flange 50 is made of the same material as that of the rotation shaft member 10 and is formed integrally with the rotation shaft member 10. The flange 50 is provided at a part of the rotation shaft member 10 in the axial direction. The flange 50 protrudes in a flange shape radially outward from an outer peripheral surface of the rotation shaft member 10. An outer diameter D4 of the flange 50 is smaller than the outer diameter D2 of the second end plate 31. A thickness of the flange 50 in the axial direction is constant in both the circumferential direction and the radial direction.

The ring 40 is arranged on the outer side of the first end plate 30 in the axial direction. That is, the first end plate 30 is arranged between the rotor core 20 and the ring 40 in the axial direction. The ring 40 is formed separately from the rotation shaft member 10. The rotation shaft member 10 is inserted on an inner peripheral side of the ring 40. The ring 40 is fixed to the rotation shaft member 10 by, for example, press fitting. An outer diameter D3 of the ring 40 is smaller than the outer diameter D1 of the first end plate 30. It is desired that the material of the ring 40 have a linear expansion coefficient equivalent to that of the material of the rotation shaft member 10.

The ring 40 includes an inner peripheral portion 41 and an outer peripheral portion 42. The inner peripheral portion 41 is adjacent to the rotation shaft member 10 in the radial direction. The outer peripheral portion 42 is provided on an outer side with respect to the inner peripheral portion 41 in the radial direction. A thickness T2 of the outer peripheral portion 42 in the axial direction is smaller than a thickness T1 of the inner peripheral portion 41 in the axial direction. With this, the ring 40 has an L shape in a cross section passing through the axial center 11. The thickness of each of the inner peripheral portion 41 and the outer peripheral portion 42 is uniform over the entire circumference in the circumferential direction. The thickness T2 of the outer peripheral portion 42 is smaller than the thickness T1 of the inner peripheral portion 41, and hence the rigidity of the outer peripheral portion 42 is lower than the rigidity of the inner peripheral portion 41. In the specification of the present application, the "rigidity" means so-called bending rigidity. The bending rigidity is an indicator indicating the difficulty in bending deformation of a member.

The inner peripheral portion 41 has a surface 41a opposed to the first end plate 30. The outer peripheral portion 42 has a surface 42a opposed to the first end plate 30. The surface 41a and the surface 42a form substantially the same surface. The surface 41a and the surface 42a are formed of a smooth surface, that is, a flat surface without an uneven processed portion. The surface 41a and the surface 42a are in contact with the first end plate 30.

The ring 40 may be fixed to the rotation shaft member 10 by shrink fitting. In this case, the rotation shaft member 10 is inserted into the heated ring 40.

Further, the rotation shaft member 10 may be screwed into the ring 40. In this case, a female thread is formed in an inner peripheral surface of the ring 40. A nut can be used as the ring 40. A male thread is formed on the outer peripheral surface of the rotation shaft member 10. The ring 40 is rotated relative to the rotation shaft member 10 so that the male thread formed on the rotation shaft member 10 is fitted into the female thread formed in the ring 40. With this, the ring 40 is mounted to the rotation shaft member 10. A part of the female thread of the ring 40 or a part of the male thread of the rotation shaft member 10 may be deformed to form a rotation stopping portion. With this, the position of the ring 40 with respect to the rotation shaft member 10 can be fixed.

The rotor core 20, the first end plate 30, and the second end plate 31 are sandwiched from both sides in the axial direction by the ring 40 and the flange 50. The ring 40 and the flange 50 function as a pair of fixing members that sandwich the rotor core 20, the first end plate 30, and the second end plate 31 from both sides in the axial direction. That is, the ring 40 functions as one fixing member, and the flange 50 functions as the other fixing member.

A gap is defined between adjacent two magnetic steel sheets 23 of the rotor core 20. In a manufacturing process for the rotor 100, the rotation shaft member 10 is inserted into the through hole 20a of the rotor core 20 by, for example, press fitting. At this time, by the inserted rotation shaft member 10, an interval between the magnetic steel sheets 23 is narrowed on the inner peripheral side of the rotor core 20. With this, an axial thickness in the outer peripheral portion of the rotor core 20 is relatively larger than an axial thickness in the inner peripheral portion of the rotor core 20. That is, the axial thickness in the outer peripheral portion of the rotor core 20 is larger than the axial thickness in the inner peripheral portion of the rotor core 20. The difference in the axial thickness between the outer peripheral portion and the inner peripheral portion of the rotor core 20 is actually small, but is illustrated in an emphasized manner in FIG. 1.

Due to the difference in the axial thickness between the outer peripheral portion and the inner peripheral portion of the rotor core 20, warpage is caused in each of the first end plate 30 and the second end plate 31. That is, the first end plate 30 is warped so as to be away from the second end plate 31 as extending radially outward. The second end plate 31 is warped so as to be away from the first end plate 30 as extending radially outward. The degree of warpage in each of the first end plate 30 and the second end plate 31 is actually small, but is illustrated in an emphasized manner in FIG. 1.

At least the surface 42a of the outer peripheral portion 42 of the ring 40 is in contact with the first end plate 30. Due to the contact between the outer peripheral portion 42 and the first end plate 30, elastic deformation is caused in the outer peripheral portion 42 particularly in the axial direction. The outer peripheral portion 42 is deformed in such a manner as to conform to the warpage of the first end plate 30.

As described above, the rotor 100 for a rotating electric machine according to this embodiment includes the rotation shaft member 10, the rotor core 20, the first end plate 30, the second end plate 31, the ring 40, and the flange 50. The rotor core 20 is arranged on the outer side with respect to the rotation shaft member 10 in the radial direction of the rotation shaft member 10. The first end plate 30 and the second end plate 31 are arranged at both ends of the rotor core 20 in the axial direction of the rotation shaft member 10. The ring 40 and the flange 50 sandwich the rotor core 20, the first end plate 30, and the second end plate 31 from both sides in the axial direction. The ring 40 is an example of a first fixing member. The flange 50 is an example of a second fixing member.

The rotor core 20 has a configuration in which the plurality of magnetic steel sheets 23 are laminated in the axial direction. The first end plate 30 is arranged between the rotor core 20 and the ring 40 in the axial direction. The second end plate 31 is arranged between the rotor core 20 and the flange 50 in the axial direction. The ring 40 includes the inner peripheral portion 41 and the outer peripheral portion 42. The outer peripheral portion 42 is provided on the outer side with respect to the inner peripheral portion 41 in the radial direction. The rigidity of the outer peripheral portion 42 is lower than the rigidity of the inner peripheral portion 41. With this, the outer peripheral portion 42 is elastically deformable in the axial direction. The outer peripheral portion 42 is in contact with the first end plate 30.

According to this configuration, the rigidity of the outer peripheral portion 42 of the ring 40 is lower than the rigidity of the inner peripheral portion 41 of the ring 40. Thus, when warpage is caused in the first end plate 30, the outer peripheral portion 42 is elastically deformed in such a manner as to conform to warpage of the first end plate 30. In particular, the surface 41a and the surface 42a of the ring 40 which are opposed to the first end plate 30 are smooth surfaces. Thus, in an abutment surface formed of the surface 41a and the surface 42a, the ring 40 and the first end plate 30 are slid relative to each other along the radial direction to cause positional shift so that a portion in which the rigidity is low in the outer peripheral portion 42 of the ring 40 is elastically deformed in the axial direction. With this, contact pressure to be applied to the first end plate 30 in the contact portion between the first end plate 30 and the outer peripheral portion 42 is suppressed so that stress generated in the first end plate 30 is dispersed. Thus, according to the above-mentioned configuration, breakage of the first end plate 30 can be suppressed.

In the rotor 100 for a rotating electric machine according to this embodiment, the rotor core 20 has the magnet insertion holes 21 formed therein. The permanent magnets 22 are inserted into the magnet insertion holes 21. Each of the first end plate 30 and the second end plate 31 is arranged so as to overlap the magnet insertion hole 21 when viewed in the axial direction. Each of the first end plate 30 and the second end plate 31 is made of a non-magnetic material.

According to this configuration, the permanent magnets 22 can be prevented from projecting out from the magnet insertion holes 21. Further, each of the first end plate 30 and the second end plate 31 is made of a non-magnetic material, thereby being capable of preventing reduction in efficiency of the rotating electric machine due to a loss of a magnetic flux or the like. In this embodiment, stress generated in the first end plate 30 is dispersed, and hence, even when the first end plate 30 is made of a non-magnetic material, breakage of the first end plate 30 can be suppressed.

Here, an interference between each of the first end plate 30 and the second end plate 31 and the rotation shaft member 10 is required to be secured also when temperature becomes higher during an operation of the rotating electric machine. Thus, when linear expansion coefficients of the material of the first end plate 30 and the second end plate 31 and the material of the rotation shaft member 10 are different from each other, the interference between each of the first end plate 30 and the second end plate 31 and the rotation shaft member 10 at low temperature may be increased to increase stress of the first end plate 30 and the second end plate 31. In this embodiment, the ring 40 having a linear expansion coefficient equivalent to that of the rotation shaft member 10 is press-fitted into the rotation shaft member 10 in one direction. Alternatively, the male thread of the rotation shaft member 10 and the female thread of the ring 40 are fastened to each other. With this, the first end plate 30 and the second end plate 31 are held on the rotation shaft member 10 even when the interference is not sufficiently secured. As a result, even when the first end plate 30 and the second end plate 31 made of a non-magnetic material are used, stress generated in the first end plate 30 and the second end plate 31 can be prevented from being increased. Thus, breakage of the first end plate 30 and the second end plate 31 can be suppressed.

In the rotor 100 for a rotating electric machine according to this embodiment, the flange 50 is formed integrally with the rotation shaft member 10. The ring 40 is formed separately from the rotation shaft member 10.

According to this configuration, the number of components can be reduced. Further, according to this configuration, the flange 50 is formed at the same time as when the rotation shaft member 10 is formed. Thus, a step of mounting the flange 50 to the rotation shaft member 10 is not required. At the time of mounting the rotor core 20, the first end plate 30, the second end plate 31, and the ring 40 to the rotation shaft member 10, it is only required to perform a step of mounting the ring 40 after mounting the rotor core 20, the first end plate 30, and the second end plate 31 to the rotation shaft member 10 from one end side in the axial direction. Thus, the rotor 100 can be manufactured at low cost.

In the rotor 100 for a rotating electric machine according to this embodiment, the thickness T2 of the outer peripheral portion 42 in the axial direction is smaller than the thickness T1 of the inner peripheral portion 41 in the axial direction. At the time of forming the ring 40, it is relatively easy to partially change the thickness of the ring 40. Thus, according to this configuration, a structure in which the rigidity of the outer peripheral portion 42 is lower than the rigidity of the inner peripheral portion 41 can easily be obtained.

In this embodiment, the thickness T1 of the inner peripheral portion 41 and the thickness T2 of the outer peripheral portion 42 are uniform over the entire circumference in the circumferential direction. With this, the rigidity of the ring 40 in the circumferential direction is made uniform, thereby being capable of preventing local stress concentration in the circumferential direction. Further, the thickness T1 of the inner peripheral portion 41 and the thickness T2 of the outer peripheral portion 42 are uniform over the entire circumference in the circumferential direction, thereby being capable of suppressing an influence on the rotation balance of the rotor 100.

Further, in this embodiment, the ring 40 has an L shape in the cross section passing through the axial center 11. With this, it is not required to provide complicated unevenness on the ring 40, thereby being capable of employing a relatively simple three-dimensional structure in the ring 40. Thus, the ring 40 can easily be formed while suppressing forming defects or the like.

Second Embodiment

Figure 2:
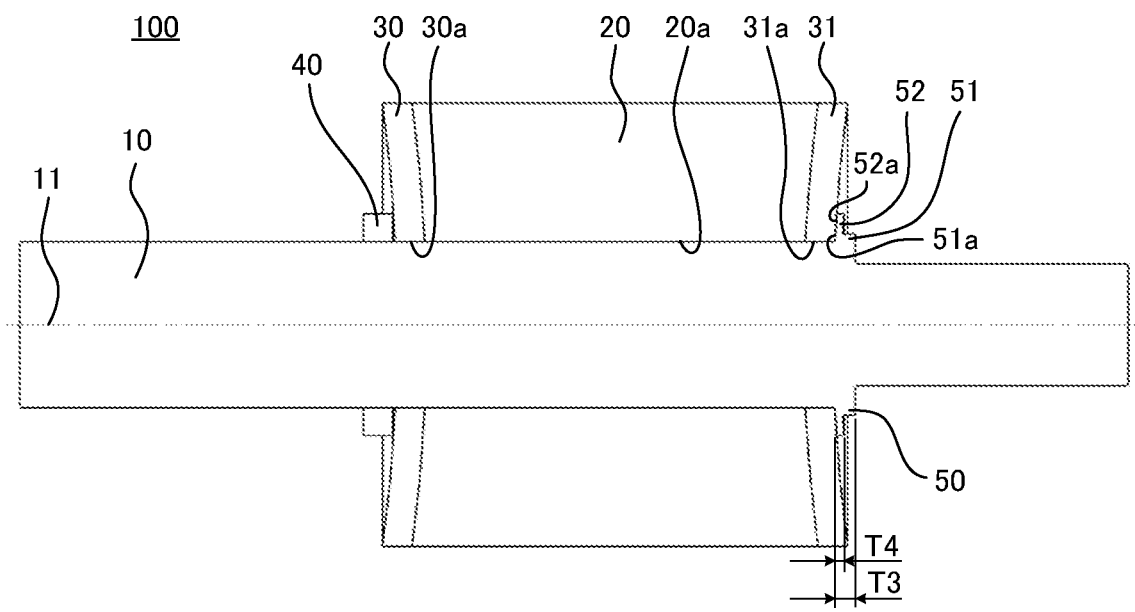
FIG. 2 is a sectional view of a rotor for a rotating electric machine according to a second embodiment.

A rotor for a rotating electric machine according to a second embodiment is described. FIG. 2 is a sectional view of the rotor for a rotating electric machine according to this embodiment. The rotor 100 of this embodiment is different from that of the first embodiment in the configurations of the ring 40 and the flange 50. Other configurations are the same as those of the first embodiment.

As illustrated in FIG. 2, the flange 50 includes an inner peripheral portion 51 and an outer peripheral portion 52. The outer peripheral portion 52 is provided on an outer side with respect to the inner peripheral portion 51 in the radial direction. The flange 50 is formed integrally with the rotation shaft member 10. A thickness T4 of the outer peripheral portion 52 in the axial direction is smaller than a thickness T3 of the inner peripheral portion 51 in the axial direction. With this, the flange 50 has an L shape in a cross section passing through the axial center 11. The thickness T4 of the outer peripheral portion 52 is smaller than the thickness T3 of the inner peripheral portion 51, and hence the rigidity of the outer peripheral portion 52 is lower than the rigidity of the inner peripheral portion 51.

The inner peripheral portion 51 has a surface 51a opposed to the second end plate 31. The outer peripheral portion 52 has a surface 52a opposed to the second end plate 31. The surface 51a and the surface 52a form substantially the same surface. At least the surface 52a of the outer peripheral portion 52 of the flange 50 is in contact with the second end plate 31. Due to the contact between the outer peripheral portion 52 and the second end plate 31, elastic deformation is caused in the outer peripheral portion 52 particularly in the axial direction. The outer peripheral portion 52 is deformed in such a manner as to conform to the warpage of the second end plate 31.

The thickness of the ring 40 in the axial direction is constant in the radial direction. The ring 40 of this embodiment has a rectangular shape in a cross section passing through the axial center 11. With this, the rigidity of the ring 40 is the same in both the inner peripheral portion and the outer peripheral portion.

As described above, in the rotor 100 for a rotating electric machine according to this embodiment, the flange 50 includes the inner peripheral portion 51 and the outer peripheral portion 52. The outer peripheral portion 52 is provided on an outer side with respect to the inner peripheral portion 51 in the radial direction. The rigidity of the outer peripheral portion 52 is lower than the rigidity of the inner peripheral portion 51. The outer peripheral portion 52 is in contact with the second end plate 31.

According to this configuration, the rigidity of the outer peripheral portion 52 of the flange 50 is lower than the rigidity of the inner peripheral portion 51 of the flange 50. Thus, when warpage is caused in the second end plate 31, the outer peripheral portion 52 is elastically deformed in such a manner as to conform to warpage of the second end plate 31. With this, contact pressure to be applied to the second end plate 31 in the contact portion between the second end plate 31 and the outer peripheral portion 52 is suppressed so that stress generated in the second end plate 31 is dispersed. Thus, according to the above-mentioned configuration, breakage of the second end plate 31 can be suppressed.

In the rotor 100 for a rotating electric machine according to this embodiment, the thickness T4 of the outer peripheral portion 52 in the axial direction is smaller than the thickness T3 of the inner peripheral portion 51 in the axial direction. At the time of forming the rotation shaft member 10 and the flange 50, it is relatively easy to partially change the thickness of the flange 50. Thus, according to this configuration, a structure in which the rigidity of the outer peripheral portion 52 is lower than the rigidity of the inner peripheral portion 51 can easily be obtained.

In this embodiment, the thickness T3 of the inner peripheral portion 51 and the thickness T4 of the outer peripheral portion 52 are uniform over the entire circumference in the circumferential direction. With this, the rigidity of the flange 50 in the circumferential direction is made uniform, thereby being capable of preventing local stress concentration in the circumferential direction. Further, the thickness T3 of the inner peripheral portion 51 and the thickness T4 of the outer peripheral portion 52 are uniform over the entire circumference in the circumferential direction, thereby being capable of suppressing an influence on the rotation balance of the rotor 100.

Further, in this embodiment, the flange 50 has an L shape in the cross section passing through the axial center 11. With this, it is not required to provide complicated unevenness on the flange 50, thereby being capable of employing a relatively simple three-dimensional structure in the flange 50. Thus, the flange 50 can easily be formed while suppressing forming defects or the like.

Third Embodiment

Figure 3:
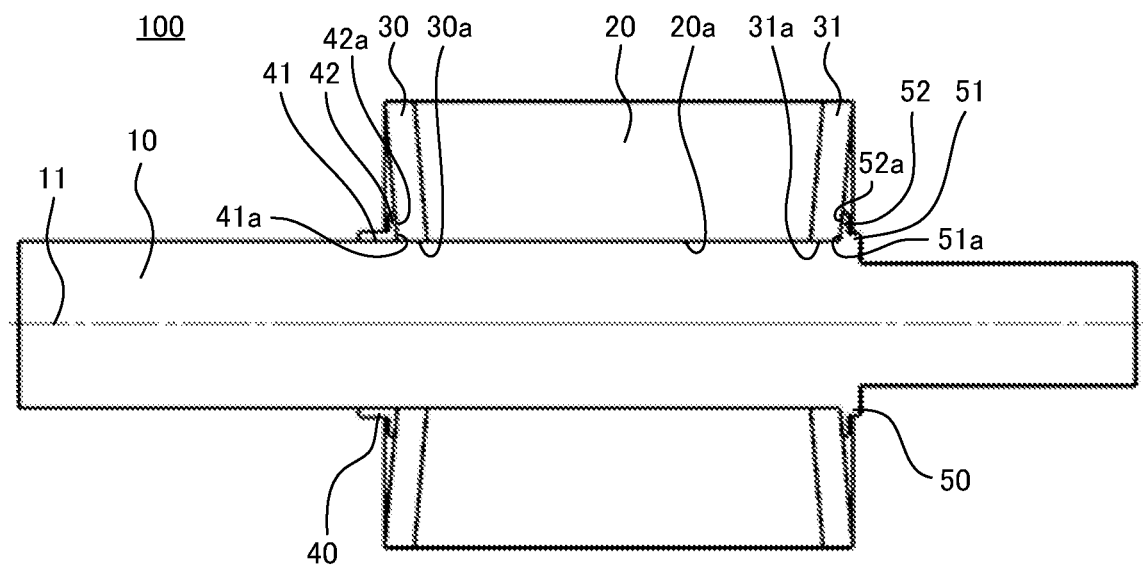
FIG. 3 is a sectional view of a rotor for a rotating electric machine according to a third embodiment.

A rotor for a rotating electric machine according to a third embodiment is described. FIG. 3 is a sectional view of the rotor for a rotating electric machine according to this embodiment. The rotor 100 of this embodiment has a configuration in which the first embodiment and the second embodiment are combined with each other.

As illustrated in FIG. 3, the ring 40 includes the inner peripheral portion 41 and the outer peripheral portion 42. A thickness of the outer peripheral portion 42 in the axial direction is smaller than a thickness of the inner peripheral portion 41 in the axial direction. With this, the rigidity of the outer peripheral portion 42 is lower than the rigidity of the inner peripheral portion 41. At least the surface 42a of the outer peripheral portion 42 of the ring 40 is in contact with the first end plate 30. The outer peripheral portion 42 is elastically deformed in such a manner as to conform to warpage of the first end plate 30.

The flange 50 includes the inner peripheral portion 51 and the outer peripheral portion 52. A thickness of the outer peripheral portion 52 in the axial direction is smaller than a thickness of the inner peripheral portion 51 in the axial direction. With this, the rigidity of the outer peripheral portion 52 is lower than the rigidity of the inner peripheral portion 51. At least the surface 52a of the outer peripheral portion 52 of the flange 50 is in contact with the second end plate 31. The outer peripheral portion 52 is elastically deformed in such a manner as to conform to warpage of the second end plate 31.

That is, in this embodiment, in both of the pair of fixing members, the rigidity of the outer peripheral portion is lower than the rigidity of the inner peripheral portion. Other configurations are the same as those of the first embodiment or second embodiment.

As described above, in the rotor 100 for a rotating electric machine according to this embodiment, the ring 40 includes the inner peripheral portion 41 and the outer peripheral portion 42. The outer peripheral portion 42 is provided on the outer side with respect to the inner peripheral portion 41 in the radial direction. The rigidity of the outer peripheral portion 42 is lower than the rigidity of the inner peripheral portion 41. The outer peripheral portion 42 is in contact with the first end plate 30. The flange 50 includes the inner peripheral portion 51 and the outer peripheral portion 52. The outer peripheral portion 52 is provided on the outer side with respect to the inner peripheral portion 51 in the radial direction. The rigidity of the outer peripheral portion 52 is lower than the rigidity of the inner peripheral portion 51. The outer peripheral portion 52 is in contact with the second end plate 31.

According to this configuration, the rigidity of the outer peripheral portion 42 of the ring 40 is lower than the rigidity of the inner peripheral portion 41 of the ring 40. Thus, when warpage is caused in the first end plate 30, the outer peripheral portion 42 is elastically deformed in such a manner as to conform to warpage of the first end plate 30. With this, contact pressure to be applied to the first end plate 30 in the contact portion between the first end plate 30 and the outer peripheral portion 42 is suppressed so that stress generated in the first end plate 30 is dispersed. Thus, according to the above-mentioned configuration, breakage of the first end plate 30 can be suppressed.

Further, according to the above-mentioned configuration, the rigidity of the outer peripheral portion 52 of the flange 50 is lower than the rigidity of the inner peripheral portion 51 of the flange 50. Thus, when warpage is caused in the second end plate 31, the outer peripheral portion 52 is elastically deformed in such a manner as to conform to warpage of the second end plate 31. With this, contact pressure to be applied to the second end plate 31 in the contact portion between the second end plate 31 and the outer peripheral portion 52 is suppressed so that stress generated in the first end plate 30 is dispersed. Thus, according to the above-mentioned configuration, breakage of the first end plate 30 can be suppressed.

In the above-mentioned first to third embodiments, the ring 40 is given as an example of one fixing member, and the flange 50 is given as an example of the other fixing member, but this disclosure is not limited thereto. Each of one fixing member and the other fixing member may be a ring formed separately from the rotation shaft member 10. In this case, at least one ring is formed such that the rigidity of the outer peripheral portion is lower than the rigidity of the inner peripheral portion. For example, at least one ring is formed such that the thickness of the outer peripheral portion in the axial direction is smaller than the thickness of the inner peripheral portion in the axial direction. According to this configuration, similarly to the above-mentioned first to third embodiments, breakage of at least one of the first end plate 30 or the second end plate 31 can be suppressed.

Further, in the above-mentioned first to third embodiments, in at least one of the ring 40 or the flange 50, the thickness in the axial direction is changed in two stages, but this disclosure is not limited thereto. For example, in at least one of the ring 40 or the flange 50, the thickness in the axial direction may be changed in multiple stages of three or more stages. That is, at least one of the ring 40 or the flange 50 may be formed in a stepwise manner such that the thickness in the axial direction is gradually reduced in three or more stages from the inner peripheral side toward the outer peripheral side. In each of the ring 40 and the flange 50, contact pressure to be applied to the end plate increases toward the outer peripheral side. Thus, the outer peripheral portion 42 of the ring 40 or the outer peripheral portion 52 of the flange 50 may be formed such that the thickness is gradually reduced toward the outer peripheral side. As described above, in at least one of the ring 40 or the flange 50, the thickness is gradually reduced toward the outer peripheral side, thereby obtaining a superior contact pressure reduction effect.

Fourth Embodiment

Figure 4:
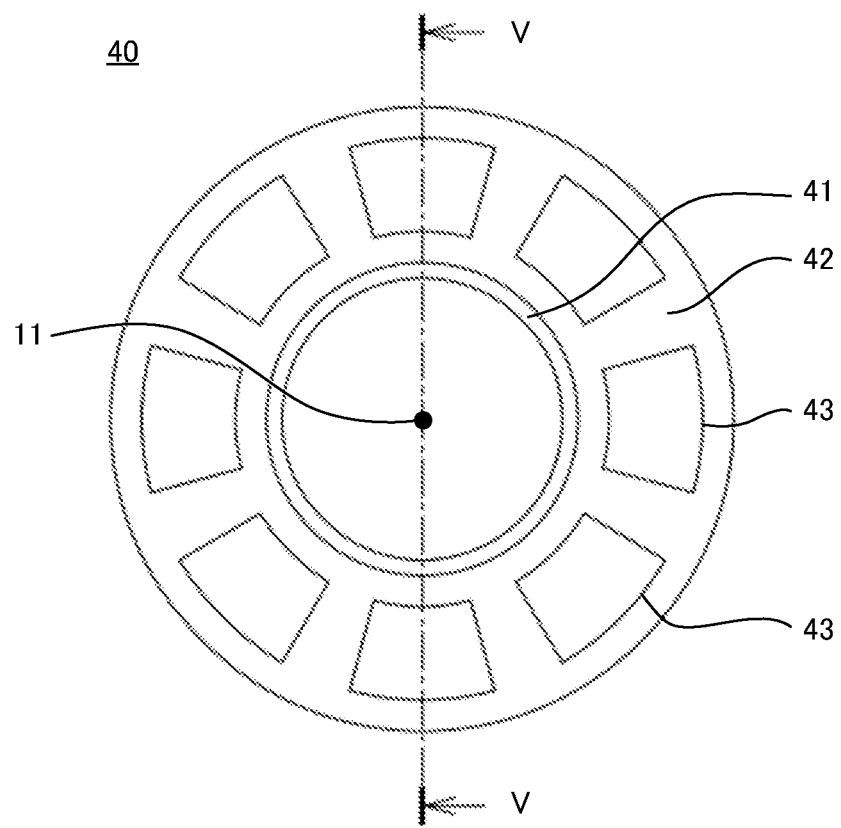
FIG. 4 is a front view of a ring included in a rotor for a rotating electric machine according to a fourth embodiment.
Figure 5:
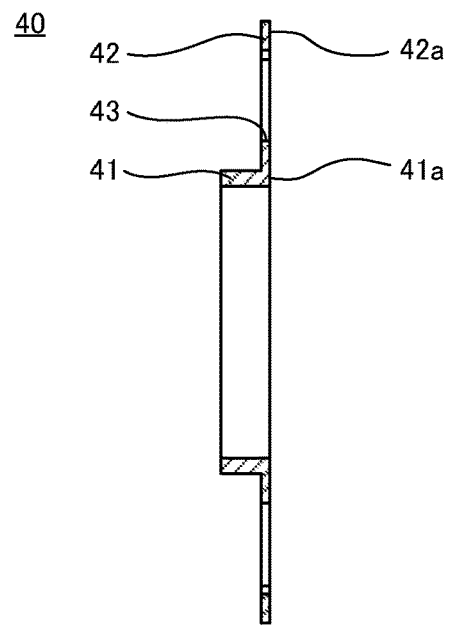
FIG. 5 is a sectional view for illustrating a cross section taken along the line V-V of FIG. 4.

A rotor for a rotating electric machine according to a fourth embodiment is described. FIG. 4 is a front view of a ring included in the rotor for a rotating electric machine according to this embodiment. In FIG. 4, a configuration of the ring 40 as viewed along the axial direction is illustrated. FIG. 5 is a sectional view for illustrating a cross section taken along the line V-V of FIG. 4. A right-and-left direction of FIG. 5 represents the axial direction. On the right side of the ring 40 illustrated in FIG. 5, the rotor core 20, the first end plate 30, and the second end plate 31 are arranged. Configurations other than the ring 40 are the same as those of the first to third embodiments.

The configuration of the ring 40 of each of the fourth embodiment, a fifth embodiment and a sixth embodiment, which are to be described later, can also be applied to the ring 40 of each of the first to third embodiments. The configuration of the ring 40 of each of the fourth to sixth embodiments can also be applied to the flange 50 of each of the second and third embodiments. The configuration of the ring 40 of each of the fourth to sixth embodiments can also be applied to both of the ring 40 and the flange 50 of the third embodiment.

As illustrated in FIG. 4 and FIG. 5, the ring 40 includes the inner peripheral portion 41 and the outer peripheral portion 42. The thickness of the outer peripheral portion 42 in the axial direction is smaller than the thickness of the inner peripheral portion 41 in the axial direction. With this, the ring 40 has an L shape in a cross section passing through the axial center 11. The thickness of the outer peripheral portion 42 is smaller than the thickness of the inner peripheral portion 41, and hence the rigidity of the outer peripheral portion 42 is lower than the rigidity of the inner peripheral portion 41.

The outer peripheral portion 42 has a plurality of opening portions 43 formed therein. Each opening portion 43 penetrates through the outer peripheral portion 42 in the axial direction. The opening portions 43 are formed, and hence the rigidity of the outer peripheral portion 42 is further lowered.

When viewed in the axial direction, the opening portions 43 have the same shape. The opening portions 43 are arranged at equal intervals in the circumferential direction. Each opening portion 43 has such a shape that each opening portion 43 is surrounded by two arcs about the axial center 11 and two straight lines extending along the radial direction. The opening portions 43 are arranged so as to be rotationally symmetric with each other about the axial center 11. With this, the gravity center position of the ring 40 matches the axial center 11.

In the outer peripheral portion 42, a thinned portion may be formed instead of the opening portions 43. The thinned portion refers to a recessed portion that does not penetrate through the outer peripheral portion 42 in the axial direction.

Figure 6:
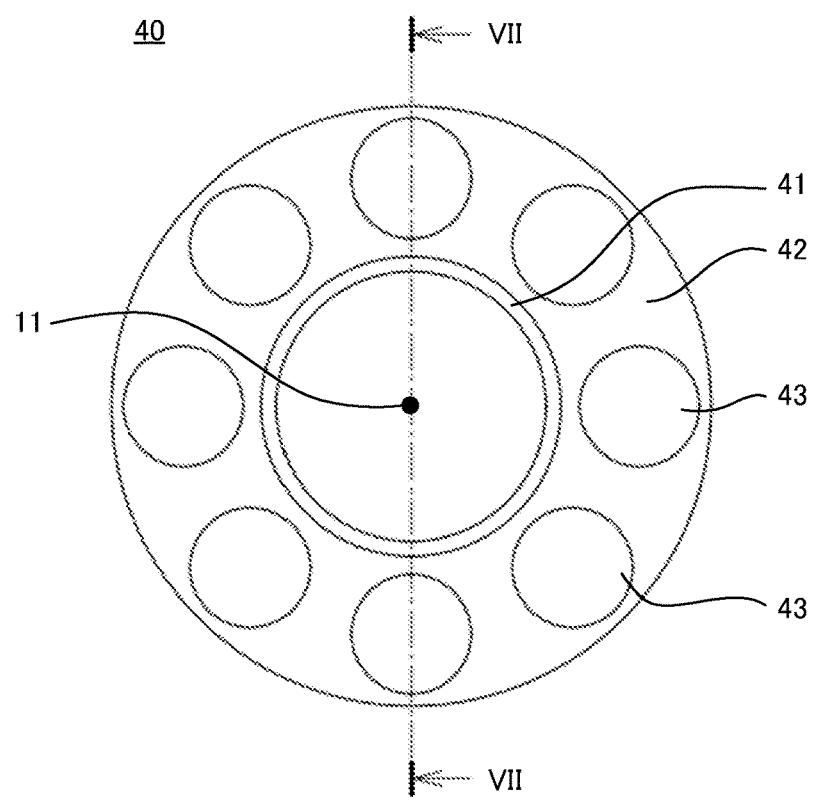
FIG. 6 is a front view of a modification example of the ring included in the rotor for a rotating electric machine according to the fourth embodiment.
Figure 7:
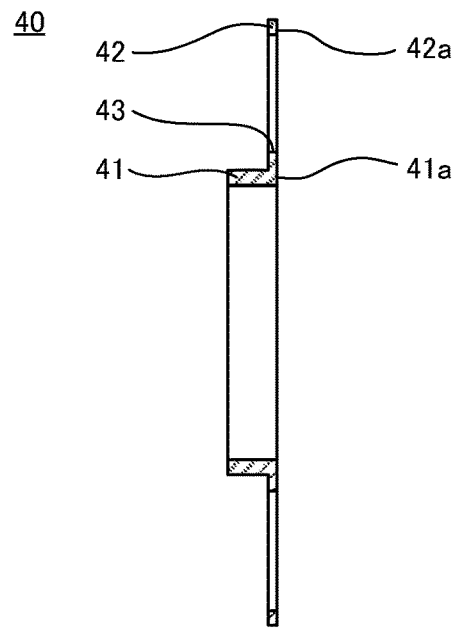
FIG. 7 is a sectional view for illustrating a cross section taken along the line VII-VII of FIG. 6.

FIG. 6 is a front view of a modification example of the ring included in the rotor for a rotating electric machine according to this embodiment. FIG. 7 is a sectional view for illustrating a cross section taken along the line VII-VII of FIG. 6. As illustrated in FIG. 6 and FIG. 7, each opening portion 43 has a circular shape. The opening portions 43 are arranged so as to be rotationally symmetric with each other about the axial center 11. Other configurations are the same as the configurations of FIG. 4 and FIG. 5.

In configurations illustrated in FIG. 4 to FIG. 7, the thickness of the outer peripheral portion 42 in the axial direction may be equal to the thickness of the inner peripheral portion 41 in the axial direction. Even in this case, the opening portions 43 are formed in the outer peripheral portion 42, and hence the rigidity of the outer peripheral portion 42 is lower than the rigidity of the inner peripheral portion 41. When the thickness of the outer peripheral portion 42 is equal to the thickness of the inner peripheral portion 41, in the outer periphery of the ring 40, an outer peripheral edge portion which is continuous in the circumferential direction at the same thickness as that of the inner peripheral portion 41 is formed. Thus, the structural strength of the ring 40 is improved.

As described above, in the rotor 100 for a rotating electric machine according to this embodiment, the opening portions 43 are formed in the outer peripheral portion 42. At the time of forming the ring 40, the opening portions 43 are formed relatively easily. Thus, according to this configuration, the structure in which the rigidity of the outer peripheral portion 42 is lower than the rigidity of the inner peripheral portion 41 can easily be obtained.

In the rotor 100 for a rotating electric machine according to this embodiment, the opening portions 43 are arranged so as to be rotationally symmetric with each other about the axial center 11 of the rotation shaft member 10. According to this configuration, the gravity center position of the ring 40 can be matched with the axial center, thereby being capable of suppressing an influence on the rotation balance of the rotor 100.

Fifth Embodiment

Figure 8:
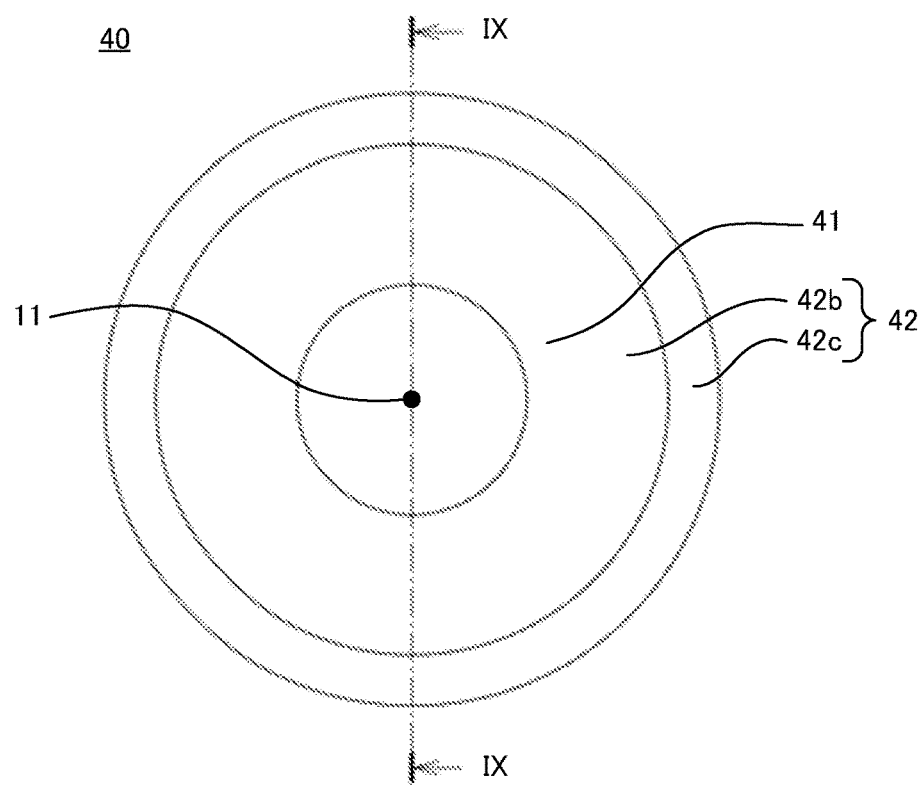
FIG. 8 is a front view of a ring included in a rotor for a rotating electric machine according to a fifth embodiment.
Figure 9:
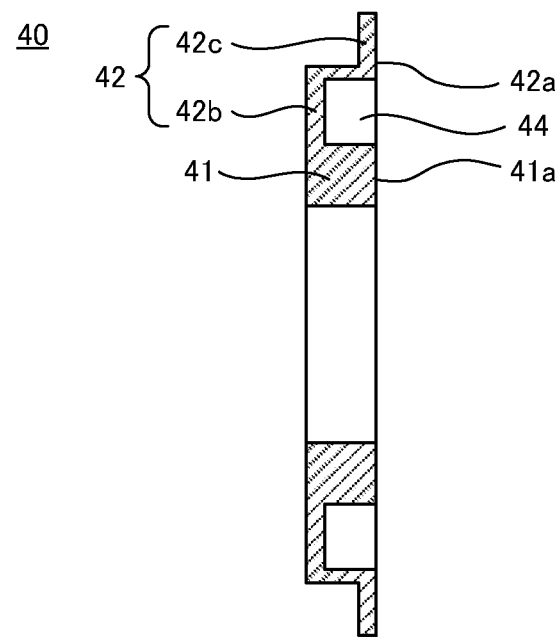
FIG. 9 is a sectional view for illustrating a cross section taken along the line IX-IX of FIG. 8.

A rotor for a rotating electric machine according to a fifth embodiment is described. FIG. 8 is a front view of a ring included in the rotor for a rotating electric machine according to this embodiment. FIG. 9 is a sectional view for illustrating a cross section taken along the line IX-IX of FIG. 8. Configurations other than the ring 40 are the same as those of the first to third embodiments.

As illustrated in FIG. 8 and FIG. 9, the ring 40 includes the inner peripheral portion 41 and the outer peripheral portion 42. The outer peripheral portion 42 includes a first outer peripheral portion 42b and a second outer peripheral portion 42c. The first outer peripheral portion 42b is provided on the outer side with respect to the inner peripheral portion 41 in the radial direction. The second outer peripheral portion 42c is provided on the outer side with respect to the first outer peripheral portion 42b in the radial direction.

In the surface 42a of the first outer peripheral portion 42b, a groove portion 44 is formed. The surface 42a is a surface to be in contact with the first end plate 30. The groove portion 44 is an example of the thinned portion. The groove portion 44 extends seamlessly in the circumferential direction. The groove portion 44 has a rectangular cross section. A thickness of the first outer peripheral portion 42b in the axial direction is equal to the thickness of the inner peripheral portion 41 in the axial direction. The groove portion 44 is formed in the first outer peripheral portion 42b, and hence the rigidity of the first outer peripheral portion 42b is lower than the rigidity of the inner peripheral portion 41.

A thickness of the second outer peripheral portion 42c in the axial direction is smaller than a thickness of the inner peripheral portion 41 in the axial direction. Thus, the rigidity of the second outer peripheral portion 42c is lower than the rigidity of the inner peripheral portion 41.

Figure 10:
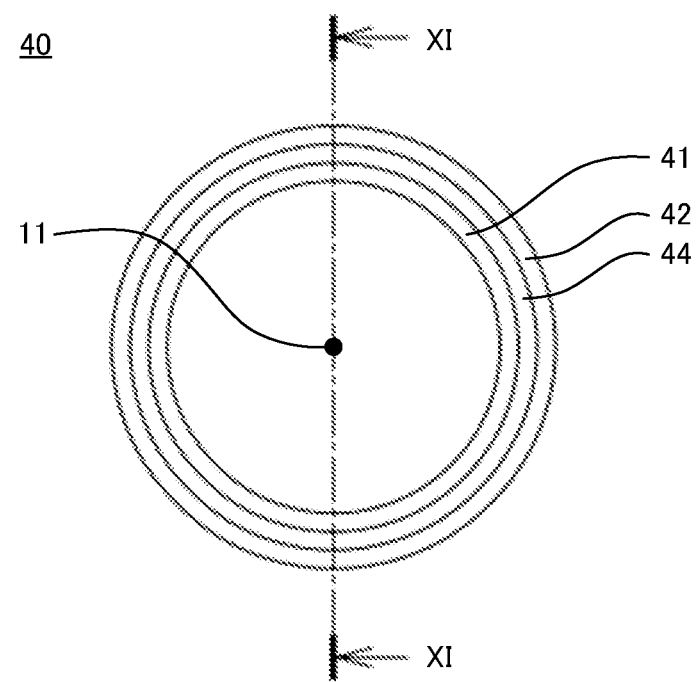
FIG. 10 is a front view of a modification example of the ring included in the rotor for a rotating electric machine according to the fifth embodiment.
Figure 11:
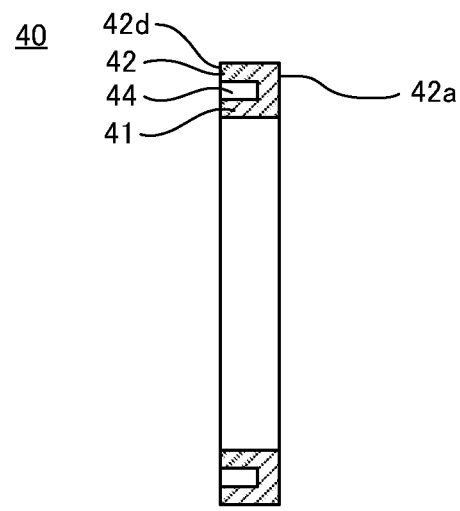
FIG. 11 is a sectional view for illustrating a cross section taken along the line XI-XI of FIG. 10.

FIG. 10 is a front view of a modification example of the ring included in the rotor for a rotating electric machine according to this embodiment. FIG. 11 is a sectional view for illustrating a cross section taken along the line XI-XI of FIG. 10. As illustrated in FIG. 10 and FIG. 11, the groove portion 44 is formed in a surface 42d of the outer peripheral portion 42. The surface 42d is a surface opposite to the surface 42a. The groove portion 44 extends seamlessly in the circumferential direction. A thickness of the outer peripheral portion 42 in the axial direction is equal to the thickness of the inner peripheral portion 41 in the axial direction. The groove portion 44 is formed in the outer peripheral portion 42, and hence the rigidity of the outer peripheral portion 42 is lower than the rigidity of the inner peripheral portion 41.

As described above, in the rotor 100 for a rotating electric machine according to this embodiment, the outer peripheral portion 42 has a thinned portion formed therein. The thinned portion is the groove portion 44 that extends in the circumferential direction of the rotation shaft member 10.

According to this configuration, the thickness of the outer peripheral portion 42 can be made uniform in the circumferential direction. With this, the rigidity of the outer peripheral portion 42 is uniform in the circumferential direction, thereby being capable of preventing stress concentration.

Further, it is not required to provide complicated unevenness on the ring 40, thereby being capable of employing a relatively simple three-dimensional structure in the ring 40. Thus, the ring 40 can easily be formed while suppressing forming defects or the like.

In addition, the gravity center position of the ring 40 can be matched with the axial center 11, thereby being capable of suppressing an influence on the rotation balance of the rotor 100.

Sixth Embodiment

Figure 12:
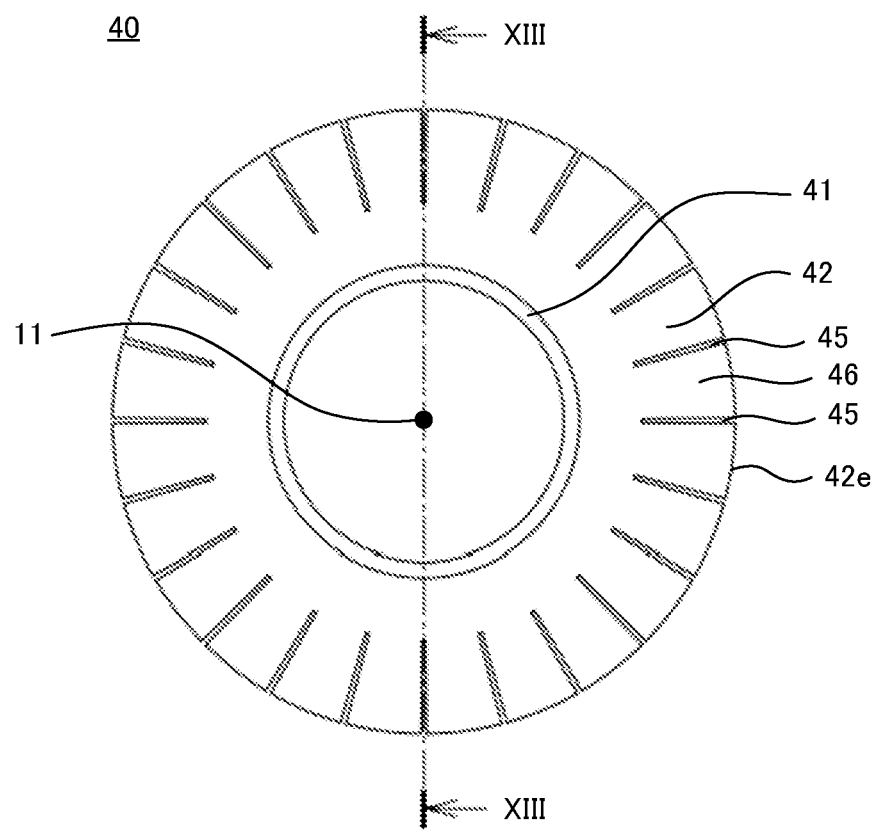
FIG. 12 is a front view of a ring included in a rotor for a rotating electric machine according to a sixth embodiment.
Figure 13:
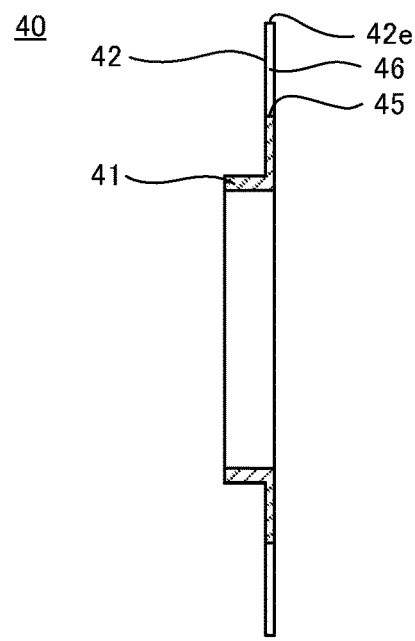
FIG. 13 is a sectional view for illustrating a cross section taken along the line XIII-XIII of FIG. 12.

A rotor for a rotating electric machine according to a sixth embodiment is described. FIG. 12 is a front view of a ring included in the rotor for a rotating electric machine according to this embodiment. FIG. 13 is a sectional view for illustrating a cross section taken along the line XIII-XIII of FIG. 12. Configurations other than the ring 40 are the same as those of the first to third embodiments.

As illustrated in FIG. 12 and FIG. 13, the ring 40 includes the inner peripheral portion 41 and the outer peripheral portion 42. A thickness of the outer peripheral portion 42 in the axial direction is smaller than a thickness of the inner peripheral portion 41 in the axial direction. With this, the ring 40 has an L shape in a cross section passing through the axial center 11. The thickness of the outer peripheral portion 42 is smaller than the thickness of the inner peripheral portion 41, and hence the rigidity of the outer peripheral portion 42 is lower than the rigidity of the inner peripheral portion 41.

The outer peripheral portion 42 has a plurality of cutouts 45 formed therein. Each cutout 45 is cut out so as to extent inward from an outer peripheral edge portion 42e of the ring 40 along the radial direction. The cutouts 45 are arranged at equal intervals in the circumferential direction. The cutouts 45 are formed so that the rigidity of the outer peripheral portion 42 is further lowered. The cutouts 45 are arranged so as to be rotationally symmetric with each other about the axial center 11. With this, the gravity center position of the ring 40 matches the axial center 11.

A remaining portion 46 is formed between two cutouts 45 adjacent to each other in the circumferential direction. A circumferential width of the remaining portion 46 is larger than a circumferential width of the cutout 45.

Figure 14:
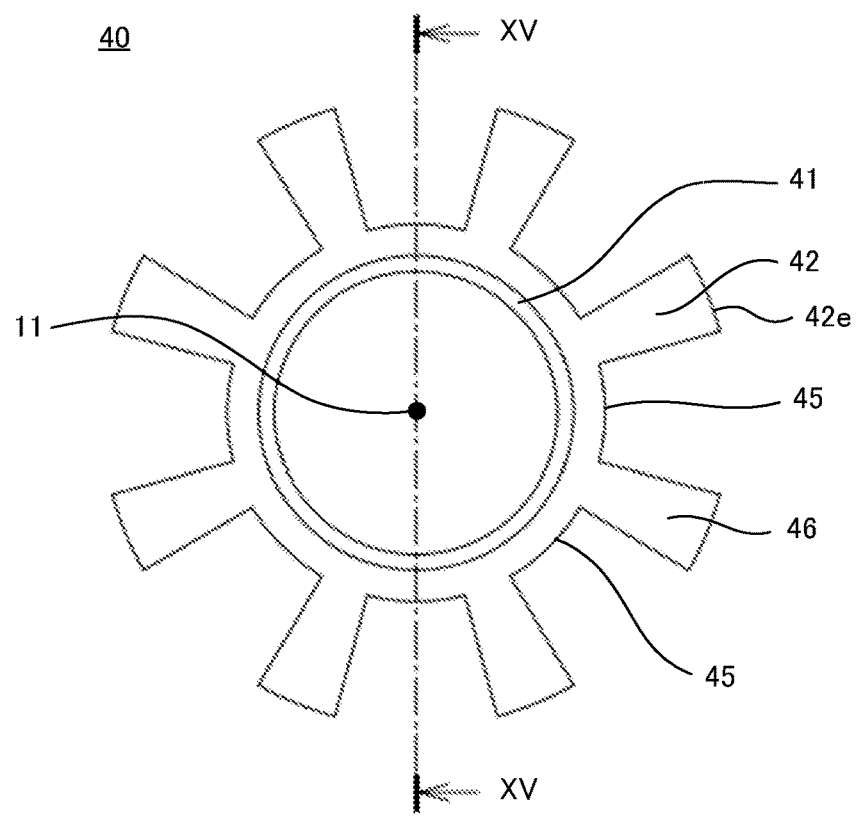
FIG. 14 is a front view of a modification example of the ring included in the rotor for a rotating electric machine according to the sixth embodiment.
Figure 15:
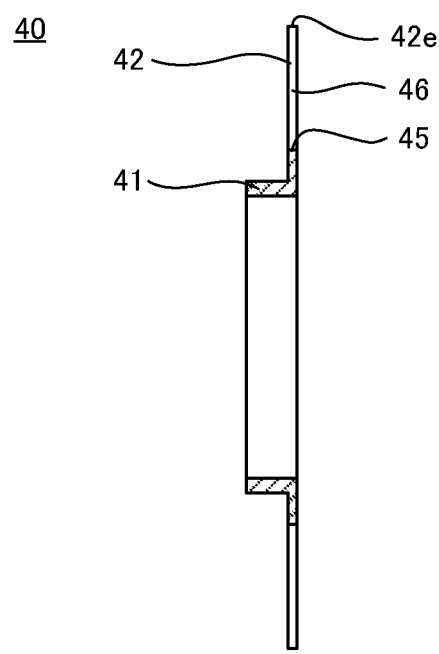
FIG. 15 is a sectional view for illustrating a cross section taken along the line XV-XV of FIG. 14.

FIG. 14 is a front view of a modification example of the ring included in the rotor for a rotating electric machine according to this embodiment. FIG. 15 is a sectional view for illustrating a cross section taken along the line XV-XV of FIG. 14. As illustrated in FIG. 14 and FIG. 15, the circumferential width of the remaining portion 46 is smaller than the circumferential width of the cutout 45. Other configurations are the same as the configurations of FIG. 12 and FIG. 13.

In configurations illustrated in FIG. 12 to FIG. 15, the thickness of the outer peripheral portion 42 in the axial direction may be equal to the thickness of the inner peripheral portion 41 in the axial direction. Even in this case, the cutouts 45 are formed in the outer peripheral portion 42, and hence the rigidity of the outer peripheral portion 42 is lower than the rigidity of the inner peripheral portion 41.

As described above, in the rotor 100 for a rotating electric machine according to this embodiment, the cutouts 45 are formed in the outer peripheral portion 42. At the time of forming the ring 40, the cutouts 45 are formed relatively easily. Thus, according to this configuration, the structure in which the rigidity of the outer peripheral portion 42 is lower than the rigidity of the inner peripheral portion 41 can easily be obtained.

In the rotor 100 for a rotating electric machine according to this embodiment, the cutouts 45 are arranged so as to be rotationally symmetric with each other about the axial center 11 of the rotation shaft member 10. According to this configuration, the gravity center position of the ring 40 can be matched with the axial center, thereby being capable of suppressing an influence on the rotation balance of the rotor 100.

The above-mentioned embodiments may be carried out in various combinations.

What is claimed is:

1. A rotor for a rotating electric machine, comprising:
a rotation shaft member;
a rotor core arranged on an outer side with respect to the rotation shaft member in a radial direction of the rotation shaft member;
a first end plate and a second end plate arranged at both ends of the rotor core in an axial direction of the rotation shaft member; and
a first fixing member and a second fixing member configured to sandwich the rotor core, the first end plate, and the second end plate from both sides in the axial direction,
wherein the first end plate is arranged between the rotor core and the first fixing member in the axial direction,
wherein the second end plate is arranged between the rotor core and the second fixing member in the axial direction,
wherein at least one of the first fixing member or the second fixing member includes an inner peripheral portion, and an outer peripheral portion provided on an outer side with respect to the inner peripheral portion in the radial direction,
wherein rigidity of the outer peripheral portion is lower than rigidity of the inner peripheral portion so that the outer peripheral portion is elastically deformable in the axial direction,
wherein the outer peripheral portion is in contact with the first end plate or the second end plate, and
wherein a surface of the outer peripheral portion which is in contact with the first end plate or the second end plate is a smooth surface, and one of the first fixing member and the second fixing member and one of the first end plate and the second end plate, which are opposed to each other with the surface interposed therebetween, are capable of sliding relative to each other along the radial direction on the surface to cause positional shift, so that the outer peripheral portion is configured to be elastically deformed in the axial direction.

2. The rotor for a rotating electric machine according to claim 1,
wherein the rotor core has a magnet insertion hole formed therein,
wherein a permanent magnet is inserted into the magnet insertion hole,
wherein each of the first end plate and the second end plate is arranged so as to overlap the magnet insertion hole when viewed in the axial direction, and
wherein each of the first end plate and the second end plate is made of a non-magnetic material.

3. The rotor for a rotating electric machine according to claim 1,
wherein one of the first fixing member or the second fixing member is formed integrally with the rotation shaft member, and
wherein the other of the first fixing member or the second fixing member is formed separately from the rotation shaft member.

4. The rotor for a rotating electric machine according to claim 1, wherein a thickness of the outer peripheral portion in the axial direction is smaller than a thickness of the inner peripheral portion in the axial direction.

5. The rotor for a rotating electric machine according to claim 1, wherein the outer peripheral portion has an opening portion or a thinned portion formed therein.

6. The rotor for a rotating electric machine according to claim 5, wherein the opening portion or the thinned portion is arranged so as to be rotationally symmetric about an axial center of the rotation shaft member.

7. The rotor for a rotating electric machine according to claim 5, wherein the thinned portion is a groove portion that extends in a circumferential direction of the rotation shaft member.

8. The rotor for a rotating electric machine according to claim 1, wherein the outer peripheral portion has a cutout formed therein.

9. The rotor for a rotating electric machine according to claim 8, wherein the cutout is arranged so as to be rotationally symmetric about an axial center of the rotation shaft member.

* * * * *